United States Patent

Brugger et al.

[11] Patent Number: 5,836,660
[45] Date of Patent: Nov. 17, 1998

[54] METHOD FOR DETERMINING A TRIGGERING THRESHOLD VALUE FOR AN AUTOMATIC BRAKE APPLICATION

[75] Inventors: Franz Brugger, Winnenden; Bernd Knoff, Esslingen; Wolfgang Kiesewetter, Waiblingen; Albrecht Eckl, Stuttgart; Manfred Steiner, Winnenden, all of Germany

[73] Assignee: Mercedes-Benz AG, Germany

[21] Appl. No.: 742,439

[22] Filed: Oct. 30, 1996

[30] Foreign Application Priority Data

Oct. 30, 1995 [DE] Germany ............ 195 40 397.5

[51] Int. Cl.$^6$ .................................................. B60T 7/06
[52] U.S. Cl. ........................................... 303/155; 303/125
[58] Field of Search ............................. 303/155, 125, 303/121, 113.1

[56] References Cited

U.S. PATENT DOCUMENTS

| | | | |
|---|---|---|---|
| 5,575,542 | 11/1996 | Tanaka et al. | 303/155 |
| 5,584,542 | 12/1996 | Klarer et al. | 303/155 |
| 5,590,937 | 1/1997 | Heibel | 303/155 |

FOREIGN PATENT DOCUMENTS

| | | |
|---|---|---|
| 40 38 290 C1 | 1/1992 | Germany . |
| 40 40 291 C2 | 6/1992 | Germany . |
| 2 294 986 | 10/1995 | United Kingdom . |

*Primary Examiner*—Matthew C. Graham
*Attorney, Agent, or Firm*—Evenson, McKeown, Edwards & Lenahan, P.L.L.C.

[57] ABSTRACT

The invention provides a method for determining a threshold value for triggering an automatic brake application wherein a braking pressure greater than that corresponding to the position of the brake pedal is developed when the actuating speed of the brake pedal exceeds a triggering threshold value determined from a preset threshold value and a vehicle-specific correction factor. According to the invention, a standard curve is stored representing the relationship between the vehicle deceleration and the pedal travel, said standard curve having a pedal travel value sP0 for a vehicle deceleration aFZG0=0 m/s$^2$. During a brake application, pairs of values for pedal travel and vehicle deceleration are determined several times, with a pedal travel value sPi0 being determined for a vehicle deceleration of 0 M/s$^2$ corresponding to each value pair, based on a curve that is the same as the standard curve. A sliding average sPm is then calculated from the values of sPi0 obtained, and the relative deviation ABW=sPm/sP0 is then determined from the value sP0 as a vehicle-specific correction factor ABW. The triggering threshold value is then determined as a function of the product of the preset threshold value VS and the vehicle-specific correction factor ABW.

8 Claims, 2 Drawing Sheets

METHOD FOR DETERMINING A TRIGGERING THRESHOLD VALUE FOR AN AUTOMATIC BRAKE APPLICATION

BACKGROUND AND SUMMARY OF THE INVENTION

The invention relates to a method for determining a threshold value for triggering automatic brake application in a vehicle automatic braking system of the type in which, when the actuating speed of the brake pedal exceeds the triggering threshold value, a brake pressure greater than that which corresponds to the position of the brake pedal is developed.

Processes of this generic type are disclosed, for example in unpublished German patent documents DE 44 40 290 and DE 40 40 291. A method for performing an automatic brake application is also described for example in German patent document DE 40 28 290 C1. The purpose of these methods is to adjust the threshold value for triggering an automatic brake application for a particular type of vehicle to reflect the specific conditions in the vehicle, which can change abruptly or continuously during operation.

The object of the present invention is to provide a method for adjusting the triggering of the automatic brake application to the specific conditions in the vehicle, which allows the triggering threshold value is to be adjusted simultaneously to different driving behavior of the vehicle.

This object is achieved by the method according to the invention in which a standard curve for the relationship between vehicle deceleration (aFZG) and pedal travel (sP) is established and stored in a memory. This standard curve includes a value sP0 for pedal travel for a vehicle deceleration of $aFZG0=0$ m/s$^2$. During a brake application, the pedal travel (sP1, sP2, . . . ) and the vehicle deceleration (aFZG1, aFZG2, . . . ) are determined and then, for each data point (that is, each pair of values) (sPi, aFZGi), a corresponding value sPi0 is determined for pedal travel at a vehicle deceleration of 0 M/s$^2$, by extrapolation of a curve which is parallel to the (stored) standard curve and passes through the data point.

From the values of sPi0 thus determined, a sliding average sPm is calculated and the vehicle-specific correction factor ABW is calculated using this sliding average. The vehicle-specific correction factor ABW is determined from the relative deviation of the sliding average sPm from the value sP0, so that ABW=(sPm−sP0)/sP0. The triggering threshold value AS is determined as a function of the product of a preset threshold value VS and the vehicle-specific correction factor ABW.

This is especially advantageous because the required calculations are easy to perform. In addition, a new correction factor ABW is determined on the basis of each measured value, so that this correction factor adjusts rapidly to changes in the specific behavior of the braking system. Moreover, the time between the individual measured values during a brake application is not taken into account, so that an adjustment to the individual behavior of the driver is also made.

According to one embodiment of the invention, however, not all the measured values of the brake applications are used to determine the correction factor ABW. When an automatic brake application is performed or the brake pressure is regulated by an antilock braking system, the values of pedal travel and vehicle deceleration determined at this time are not taken into account. Neither are the values used to determine the correction factor ABW when the vehicle speed is less than 30 km/h or greater than 130 km/h, when the pedal speed exceeds a limiting value (40 mm/s), or when the vehicle deceleration is less than 1 m/s$^2$ or greater than 4 m/s$^2$.

These and other objects, features and advantages of the present invention will become more readily apparent from the following detailed description of the drawing wherein:

DETAILED DESCRIPTION OF THE DRAWINGS

Figure 1:
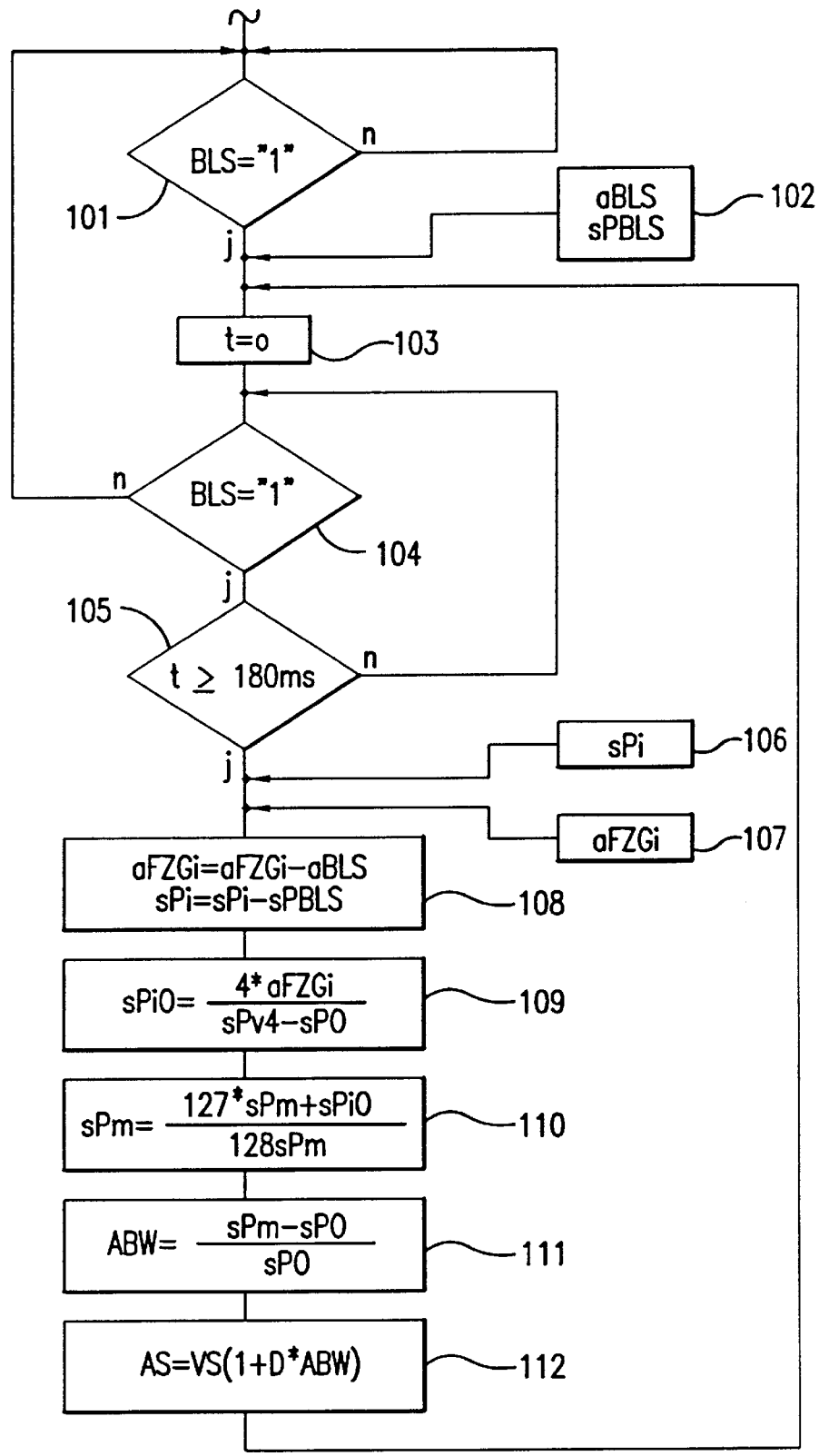
FIG. 1 is a flowchart which illustrates an embodiment of the method according to the invention.

FIG. 1 shows the flowchart of an embodiment of the method according to the invention for determining the triggering threshold value of an automatic brake application.

In step 101, an initial determination is made as to whether the brake pedal has been depressed to the point where the brake light switch has been turned on (BLS=1) and the brake lights are lit. If not, the process recycles to the beginning. However, if BLS=1, meaning that the brakes are currently being operated, in step 102, the pedal travel sPBLS which the brake pedal has shown initially is read in and stored. At the same time, the current value of the vehicle deceleration aBLS is also measured and stored. This provides a fixed common reference, defined for all brake applications, for pedal travel measurement during different brake applications, so that any drift in the pedal travel sensor can be compensated. The influences on the vehicle deceleration aFZG that cannot be attributed to a brake application, such as driving uphill or downhill or engine drag torque, can be compensated. It should be noted in this connection that the aBLS value has a sign; in other words, a distinction must be made between vehicle acceleration and deceleration.

In step 103, time counter t is reset to zero. (The only function of the time counter is to make sure that measured value acquisition takes place at regular intervals.) In step 104, another check is made to determine whether the brake light switch is turned on. If not acquisition of measured values is terminated, and processing recycles to the start (step 101). Otherwise, a check is made in step 105 to determine whether the desired clock time, 180 ms in this case for example, has elapsed since the timer was reset. If this is not the case, the process returns to step 104, forming a waiting loop.

As soon as the desired clock time has elapsed, in step 106 the current value sPi for pedal travel and in step 107 the current value aFZGi for vehicle deceleration are read in. Here, i is a counting parameter that is continuously incremented and is required only to distinguish the individual points for describing the method. The counting parameter is not required to perform the method, since each individual measured value can be processed immediately before the next measured value is determined.

In step 108, any drift in the pedal travel sensor is corrected by reference to the values sPBLS and aBLS read in step 102. That is, the pedal travel sPBLS determined for the current brake application is subtracted from pedal travel sPi (in other words, sPi=sPi−sPBLS). Influences on vehicle deceleration that are not based on brake application are therefore compensated, with the deceleration aBLS determined for the current brake application being subtracted from the current vehicle deceleration value aFZGi, so that aFZGi=aFZGi−aBLS.

In step 109, the pair of values determined in step 108 is used to determine a corresponding value sPi0 for pedal travel at vehicle declaration a FZG=0 m/s² by extrapolation of a curve which has the same shape as the stored standard curve and passes through the data point defined by that pair of values. This corresponding pedal travel is thus determined by the equation:

$$sPi0 = sPi - \frac{4 \cdot aFZGi}{sPv4 - Sp0}$$

In step 110, the sliding average sPm is calculated on the basis of the value sPi0. This takes place for example in accordance with the equation $$sPm = \frac{127 \cdot sPm + sPi0}{128 \cdot sPm}$$

with the factors 127 and 128 merely representing an evaluation of the next preceding average relative to the value of sPi0 just determined. The factor must be determined in accordance with the desired speed of reaction to changes in the brake system and the desired damping of fluctuations in regulation.

On the basis of the sliding average obtained, in step 111 the relative deviation ABW of this average from the value of sP0 is calculated by the equation $$ABW = \frac{sPm - sP0}{sP0}$$

On the basis of a preset threshold value VS, the triggering threshold value AS is obtained in step 112 by the equation $$AS = VS(1 + ABW \cdot D)$$

where the reverse amplification factor D determines how greatly the deviation will affect the change in the threshold value. (The reverse amplification factor D, which is determined in driving tests, can assume numerical values in the range from 0.5 to 1.5.) Following step 112, processing returns to step 103.

According to embodiments of the invention, the sliding average sPm thus obtained is not deleted when the ignition is turned off, but is stored in a non-volatile memory to be available as an initial value next time the vehicle is started. It is then especially advantageous for adjustment and repair tasks if the value sPm can be set to a certain value sPmd when the control device which performs the method is connected with a diagnostic device. Alternatively, a certain value for sPm could be set each time after starting. It should also be noted that if the values of vehicle deceleration aFZG are filtered when they are evaluated, to compensate for unrealistic measured value fluctuations, it is advantageous to subject the measured values of pedal travel sP to the same filter in order to maintain a match in time behavior between pedal travel sP and vehicle deceleration aFZG.

Figure 2:
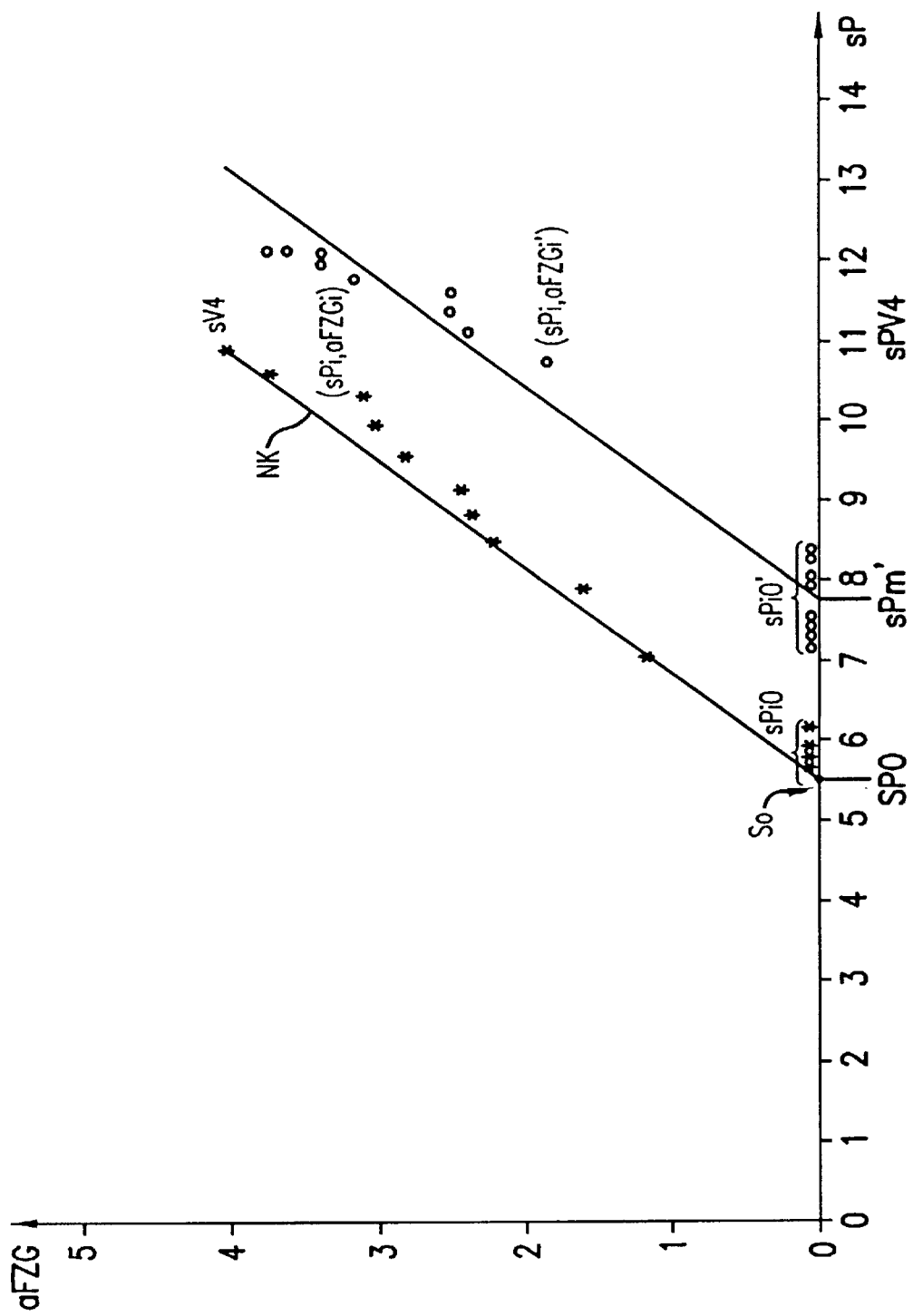
FIG. 2 is a graph of pedal travel as a function of vehicle deceleration which shows the standard curve and examples of pedal travel and vehicle deceleration values recorded during a brake application for two different brake systems.

FIG. 2 is a graph showing the functional relationship between pedal travel (plotted along the abscissa) and vehicle deceleration (plotted on the ordinate). Standard curve NK is greatly simplified, and shows the target relationship between pedal travel and vehicle deceleration. It is determined by setting the coordinates of points s0 and sV4. Point s0 has a pedal travel sP0 and a vehicle deceleration 0 m/s², while point sV4 has a pedal travel sPV4 and a vehicle deceleration of 4 m/s². An asterisk marks data points of a first sequence of values for brake pedal travel sP and vehicle deceleration aFZG, determined at intervals during a brake application, while a circle represents the second sequence. (The measured values for the second sequence corresponding to a brake system in which air bubbles have formed in the brake fluid.)

The actual data points with coordinates (sPi, aFZGi) of the first sequence of measured values and the associated values of points sPi0 on the abscissa diverge by only an insignificant distance from the standard curve, plotted as a solid line. The values of the second sequence of measurement values with coordinates (sPi', aFZGi') show a clear deviation from the standard curve. The extrapolated abscissa intercepts points sPi0' also lie on the abscissa, clearly displaced toward higher abscissa values. The dashed line shows the curve parallel to the standard curve, in other words the curve analogous to the standard curve, using the sliding average sPm' determined from the values of sPi0'.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for determining a triggering threshold value for automatic brake application in an automatic braking system of the type in which, when an actuating speed of a brake pedal exceeds the triggering threshold value, a braking pressure greater than the braking pressure corresponding to the position of the brake pedal is developed, with the triggering threshold value being determined from a preset threshold value and a vehicle-specific correction factor, said method comprising the steps of:

storing a standard curve representing a relationship between vehicle deceleration and pedal travel, which standard curve includes a value sP0 for pedal travel at a vehicle deceleration of aFZG0=0 m/s²;

determining pairs of values for pedal travel and corresponding vehicle deceleration several times during a brake application;

extrapolating a value sPi0 for pedal travel at a vehicle deceleration of 0 M/s² for each value pair of values, based on a curve analogous to the curve of the standard curve;

calculating a sliding average sPm from the values of sPi0 obtained;

determining a relative deviation ABW=sPm/sP0 from the value of sP0 as a vehicle-specific correction factor ABW; and determining a triggering threshold value as a function of the product of preset threshold value VS and vehicle-specific correction factor ABW.

2. Method according to claim 1, wherein the standard curve is a straight line defined by two points.

3. Method according to claim 1, comprising the further steps of:

determining an initial pedal travel at a moment when the brake light switch operates, and subtracting said initial pedal travel sPBLS from subsequent measured values of pedal travel.

4. Method according to claim 1, wherein measured values of pedal travel are subjected to filtration by a first filter characterized by filter parameters, and measured values of vehicle deceleration are subjected to filtration by a second filter having filter parameters which are substantially the same as the filter parameters of the first filter.

5. Method according to claim 1, wherein that the measured values are taken into account only when the following conditions are met:

a brake light switch is turned on;

an automatic brake application is not being performed;

braking pressure is not being regulated by an antilock braking system;

vehicle speed is between 30 km/h and 100 km/h;

vehicle deceleration is between 1 and 4 m/s$^2$; and pedal actuating speed is less than 40 mm/s.

6. Method according to claim 1, wherein that acquisition of measured values is performed at intervals of 100 ms to 250 ms.

7. Method according to claim 1, wherein that the sliding average remains stored even when the ignition is switched off.

8. Method according to claim 1, wherein that the sliding average can be set to a specified value when the vehicle is connected by a data interface to a diagnostic device.

* * * * *